United States Patent [19]
Lehto

[11] Patent Number: 5,928,398
[45] Date of Patent: Jul. 27, 1999

[54] METHOD AND APPARATUS FOR BENDING AND TEMPERING GLASS SHEETS

[75] Inventor: Esko Lehto, Kangasala, Finland

[73] Assignee: Tamglass Engineering OY, Tampere, Finland

[21] Appl. No.: 08/577,261

[22] Filed: Dec. 22, 1995

[51] Int. Cl.$^6$ .................. C03B 23/023; C03B 27/04; C03B 13/16
[52] U.S. Cl. .................. 65/104; 65/106; 65/114; 65/245; 65/268; 65/273; 65/275; 65/287; 65/348; 65/351; 65/370.1
[58] Field of Search .............. 65/104, 106, 107, 65/114, 111, 244, 245, 268, 273, 275, 287, 289, 290, 291, 370.1, 348, 351, 253, 254

[56] References Cited

U.S. PATENT DOCUMENTS

| | | | |
|---|---|---|---|
| 2,983,635 | 5/1961 | Richardson | 65/370.1 |
| 3,799,752 | 3/1974 | Cheron | 65/104 |
| 4,139,359 | 2/1979 | Johnson et al. | 65/104 |
| 4,226,608 | 10/1980 | McKelvey | 65/245 |
| 4,540,425 | 9/1985 | Bocelli et al. | 65/107 |
| 4,540,426 | 9/1985 | Bocelli et al. | 65/104 |
| 4,556,406 | 12/1985 | Kahle | 65/107 |
| 4,586,946 | 5/1986 | Kramer et al. | 65/273 |
| 4,619,683 | 10/1986 | Halberschmidt et al. | 65/114 |
| 4,773,925 | 9/1988 | Schultz . | |
| 4,822,398 | 4/1989 | McMaster et al. . | |
| 4,881,962 | 11/1989 | Reunamaki et al. | 65/273 |
| 4,883,527 | 11/1989 | McMaster et al. . | |
| 4,909,819 | 3/1990 | McMaster et al. . | |
| 4,909,824 | 3/1990 | McMaster et al. . | |
| 4,957,528 | 9/1990 | Letemps et al. | 65/104 |
| 4,957,531 | 9/1990 | McMaster et al. . | |
| 5,009,693 | 4/1991 | Freidel et al. . | |
| 5,045,103 | 9/1991 | McMaster et al. . | |
| 5,057,137 | 10/1991 | Reunamaki et al. | 65/273 |
| 5,059,233 | 10/1991 | Milhkinen et al. | 65/104 |
| 5,118,334 | 6/1992 | Freidel et al. . | |
| 5,246,477 | 9/1993 | Kramer | 65/245 |
| 5,443,609 | 8/1995 | Letho . | |

FOREIGN PATENT DOCUMENTS

| | | |
|---|---|---|
| 114168 | 8/1984 | European Pat. Off. . |
| 261611 | 3/1988 | European Pat. Off. . |
| 421784 | 4/1991 | European Pat. Off. . |
| 89/01458 | 2/1989 | WIPO . |

*Primary Examiner*—Steven P. Griffin
*Attorney, Agent, or Firm*—Burns, Doane, Swecker & Mathis, L.L.P.

[57] ABSTRACT

An apparatus for bending and tempering glass sheets includes a roll conveyor for supporting a glass sheet, the glass sheet having a top and a bottom surface. The roll conveyor includes a plurality of vertically movable rolls for arching the conveyor to a curvature corresponding to a desired degree of bending in the glass sheet. The rolls each have two opposed ends, and at least some of the rolls being deflectable such that at least mid-sections thereof are movable relative to a vertical position of ends thereof. The apparatus further includes a plurality of movable press rollers disposed above the rolls. The press rollers are movable in a vertical direction to apply a pressing force to the top surface of the glass sheet.

11 Claims, 3 Drawing Sheets

METHOD AND APPARATUS FOR BENDING AND TEMPERING GLASS SHEETS

FIELD OF THE INVENTION

The present invention relates to a method and apparatus for bending and tempering glass sheets.

BACKGROUND AND SUMMARY

The apparatus according to an aspect of the present invention includes a roll conveyor having vertically movable rolls, the roll conveyor thereby being adjustable for arching the conveyor to a curvature matching a desired degree of bending around a bending axis which is transverse to the advancing direction of glass sheets or parallel to the rolls. The apparatus further includes lower tempering boxes having top surfaces provided with tempering orifices, and upper tempering boxes having bottom surfaces provided with tempering orifices. The tempering boxes are movable for moving the top and bottom surfaces to comply with the arching of the conveyor. This type of apparatus is prior known from the Applicant's Patent publications U.S. Pat. No. 4,881,962 and U.S. Pat. No. 5,057,137. This apparatus has proved highly useful in the production of bent and tempered construction glass.

In this prior known apparatus, the bending of a glass sheet is based on gravitational deflection within a bending and tempering station outside a heating furnace. For this reason it is sometimes necessary to overheat the glass relative to a required tempering temperature as the glass temperature falls before the glass has completely bent to its desired configuration and the glass tempering can be commenced.

Depending on the glass types and conditions, the cooling of glass is typically in the order of 10° C.–25° C.

A characterizing feature for this so-called overheating in that the optical errors of glass are accentuated and are more perceivable in the end product.

In addition, a limitation in this prior known method and apparatus is that a glass sheet can only be bent or deflected relative to a single axis of curvature.

An object of the invention is to improve the above known method and apparatus such that glass can be bent to produce a double curvature and, in addition, harmful overheating can be eliminated from the process for reducing the temperature of glass coming out of a furnace and for improving the glass optics.

When adjustable press rollers are included above the glass, the gravitational bending is converted into mechanical press bending. When the glass is also supported on the rolls of an arched roll conveyor, with the mid-section of the rolls at a lower level than the ends of the rolls, the bending will be achieved around two axes perpendicular to each other and, in addition, the glass sheet will have a bent shape with improved precision as the bending can be controlled and forced to a desired shape.

The bending of glass with a set of upper and lower rollers in a combined bending and tempering station has already been proposed in the Patent publication U.S. Pat. No. 4,822,398. According to that patent, however, the bending is solely effected around a bending axis parallel to the advancing direction of a glass sheet. A double curvature cannot be achieved and, in addition, the rather small radii of curvature causes optical problems due to the fact that the rolls responsive to either surface of the glass during the course of bending shift laterally relative to the glass, i.e. slide along the glass surface in the direction transverse to the advancing direction. This makes it difficult to fulfill requirements for high optical quality. In the present invention, the bending with a smaller radius of curvature can be selected around an axis transverse to the advancing direction. The flexible suspension of press rolls and the press force adjustable during the course of bending enable the adaptation of the invention to benders in which the bending is effected around axes both transverse and parallel to the advancing direction.

BRIEF DESCRIPTION OF THE DRAWINGS

One way of implementing the invention will now be described in more detail with reference made to the accompanying drawings, in which.

DETAILED DESCRIPTION

Figure 1:
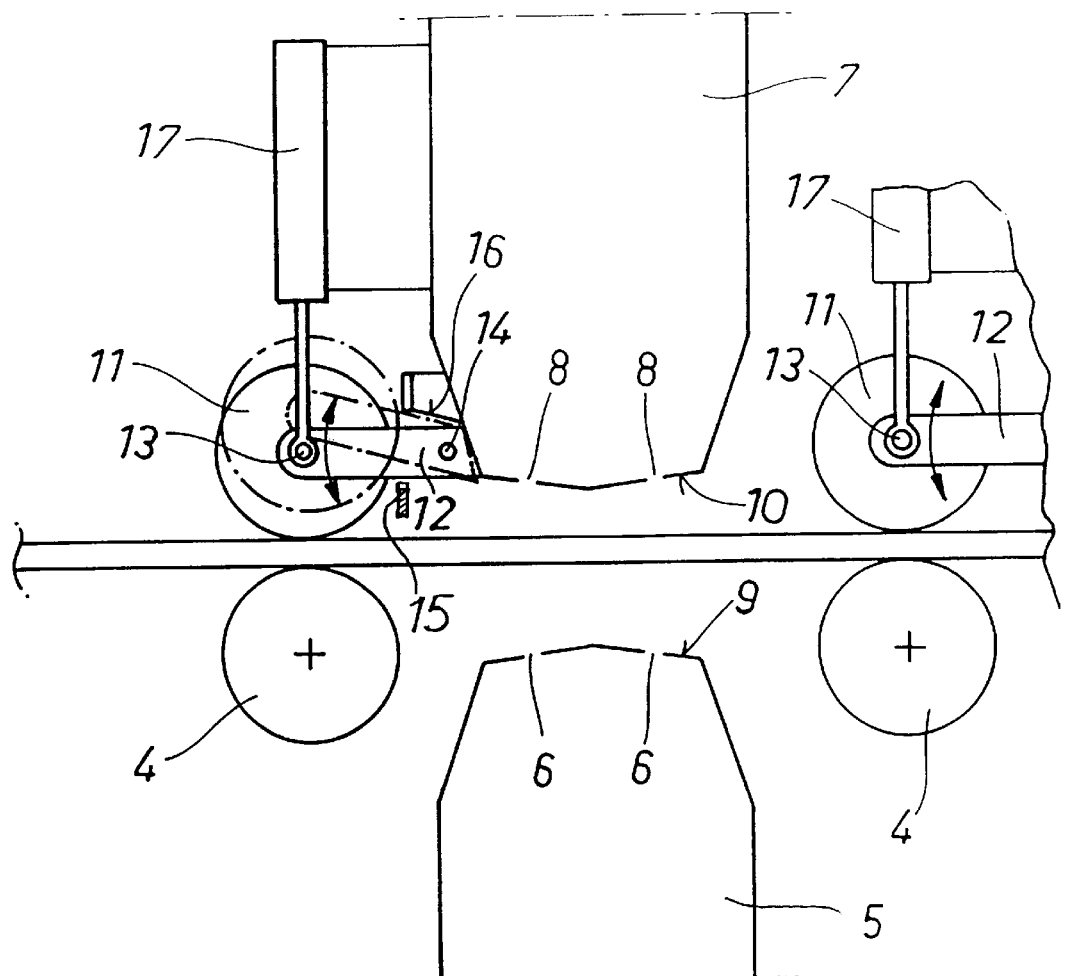
FIG. 1 is a partially cross-sectional, side, schematic view of a bending and tempering station according to an embodiment of the present invention.

Downstream of a furnace 1 lies a bending and tempering station 2 provided with a conveyor 3 consisting of rolls 4. Below a glass sheet carried by the rolls 4 are tempering boxes 5 and thereabove are tempering boxes 7. The tempering boxes 5 have top surfaces 9 provided with nozzle orifices 6 and the tempering boxes 7 have bottom surfaces 10 provided with nozzle orifices 8. Nozzles enclosed in the tempering boxes 5 and 7 are not shown and the design and configuration thereof can be varied in many ways.

As disclosed in more detail in U.S. Pat. No. 4,881,962 and U.S. Pat. No. 5,057,137, which are both incorporated by reference, the conveyor 3 can be arched to a curvature corresponding to a degree of bending desired for the glass. This can be effected by any mechanism capable of moving the rolls 4 relative to each other in a vertical direction. The nozzle boxes 5 and 7 are adapted to be movable in a corresponding manner, such that the upper and lower array of boxes have a curvature matching that of the conveyor 3.

Thus, the box surfaces 9 and 10 maintain essentially the same distance from the glass surface, whereby the glass sheets can be tempered effectively and uniformly irrespective of their degree of bending.

Figure 4:
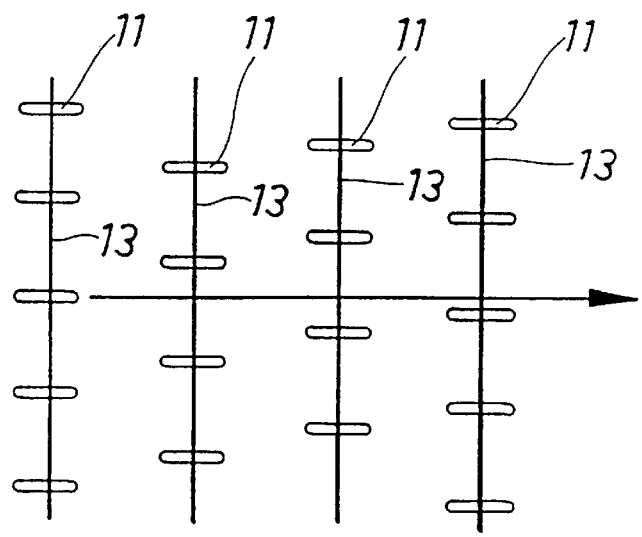
FIG. 4 is a plan view of an arrangement of press rollers in a bending and tempering station according to an embodiment of the present invention.
Figure 5:
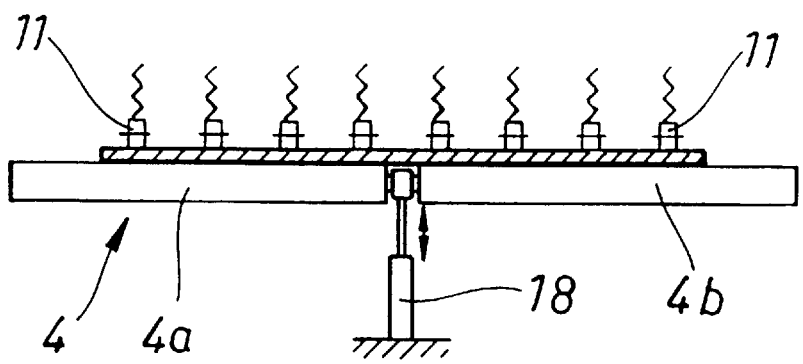
FIG. 5 is a partially cross-sectional schematic view of a glass sheet included in a bending and tempering station according to an embodiment of the present invention wherein the glass sheet is between the press rollers and a roll conveyor prior to a bending operation.
Figure 6:
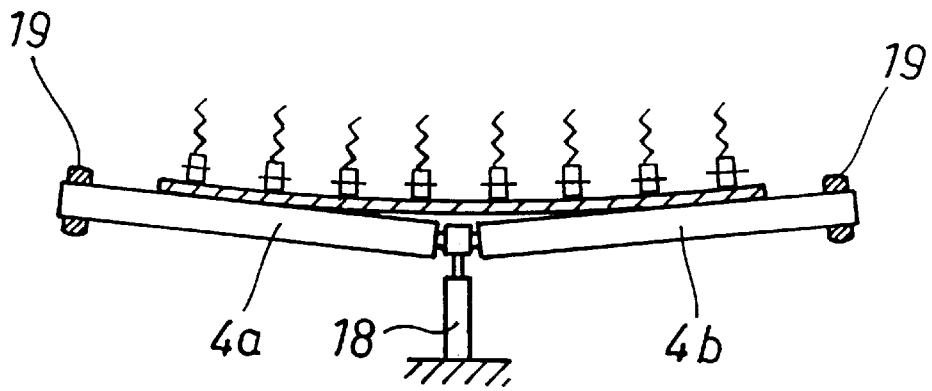
FIG. 6 is a partially cross-sectional schematic view of a glass sheet included in a bending and tempering station according to an embodiment of the present invention wherein the glass sheet is between the press rollers and a roll conveyor during or after a bending operation.
Figure 7:
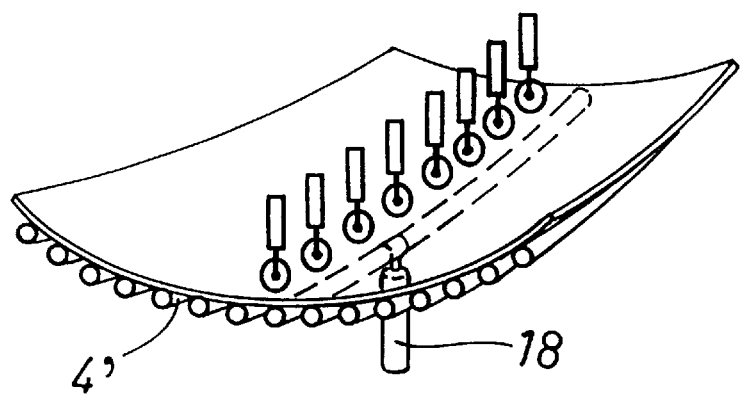
FIG. 7 is a perspective view showing a glass sheet bent in two directions and the position of press rollers and deflected rolls included in an arched conveyor according to an embodiment of the present invention.

The major curvature (with a minor radius of curvature) of a double curvature is produced by arching the conveyor and the minor curvature (with a major radius of curvature) is produced by deflecting or arching the rolls 4, as shown in FIGS. 5–6, and 4', as shown in FIG. 7, such that the mid-section of the rolls shifts to a lower level than the ends thereof. The production of such a double curvature requires a particularly adjustable mechanical pressing from above.

The upper tempering boxes 7 are fitted with a number of press rollers 11, each being adapted to be individually movable by means of a pressure control device such as a pneumatic cylinder 17 between an upper rest position and a lower working position. The axially short and lightweight rollers 11 are journalled onto a stub axle 13 which is fastened to the end of the piston rod of cylinder 17. Linked to the axle 13 is also a swinging arm 12 limiting the vertical movement of the axle 13. The swinging arm 12 is fastened by means of a hinge pin 14 to a lug included in the side surface of box 7. Limiting abutments 15 and 16 preferably define the boundaries for the swinging motion of arm 12. The bottom position limiting abutment 15 is adjustable during a bending operation. No limiting abutment 15 is required if the rolls 4 are deflectable to a continuous arch (FIG. 7) and the rollers 11 are allowed in the bottom position thereof to respond to the rolls 4 (with no glass sheet therebetween). If the bottom limiting abutment 15 is used, the bottom surface of roller 11 has typically a bottom position (if there is no glass between the rollers and rolls) which is a few millimeters below the top surface of glass, yet out of contact with the rolls 4. The roller 11 may have a fixed top position, e.g., 8–10 mm from the plane defined by the top surface of rolls 4.

The adjustment of the air pressure of pneumatic cylinder 17 can be used for producing a desired pressing force for promoting the glass bending. If desired, the pressing force can also be adjusted over zones of the glass sheet during the course of bending. Thus, the cylinders 17 included in various zones are provided with a different pressure. The pneumatic cylinder 17 has a diameter of, e.g., 8–10 mm and a length which is preferably about 5 times the diameter for providing a suitable resilience. The common control of all pneumatic cylinders 17 can be used for operating all rollers 11 simultaneously between the top and bottom end positions.

Figure 2A:
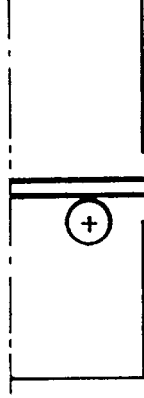
FIG. 2A is a side schematic view of a furnace and a bending and tempering station according to an embodiment of the present invention showing a transfer of a glass sheet from the furnace into the bending and tempering station.
Figure 2B:
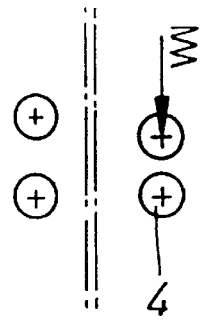
FIG. 2B is a side schematic view of a furnace and a bending and tempering station according to an embodiment of the present invention showing the position of rolls and rollers after a glass sheet has progressed from the furnace and into the bending and tempering station.

As shown in FIG. 2A, upon the arrival of a glass sheet in the bending and tempering station, the press wheels 11 are in their top position slightly off the glass surface or they can also be in light contact therewith. When the glass is completely inside the bending station (FIG. 2B), the bending commences. The press wheels 11 are simultaneously provided with a desired and adjustable down-force forcing the glass to conform to the rolls 4 of the flexing conveyor. However, the glass reciprocates in an oscillating fashion during the course of bending. In the illustrated case, the press rollers 11 are on top of the conveyor rolls 4 and, in the bottom position of rollers 11, the distance therebetween is slightly less than the thickness of a glass sheet to be bent. When the leading edge of a glass sheet arrives between roll 4 and rollers 11, the rollers 11 shift a small distance upwards against the force of the pneumatic spring 17.

Figure 3:
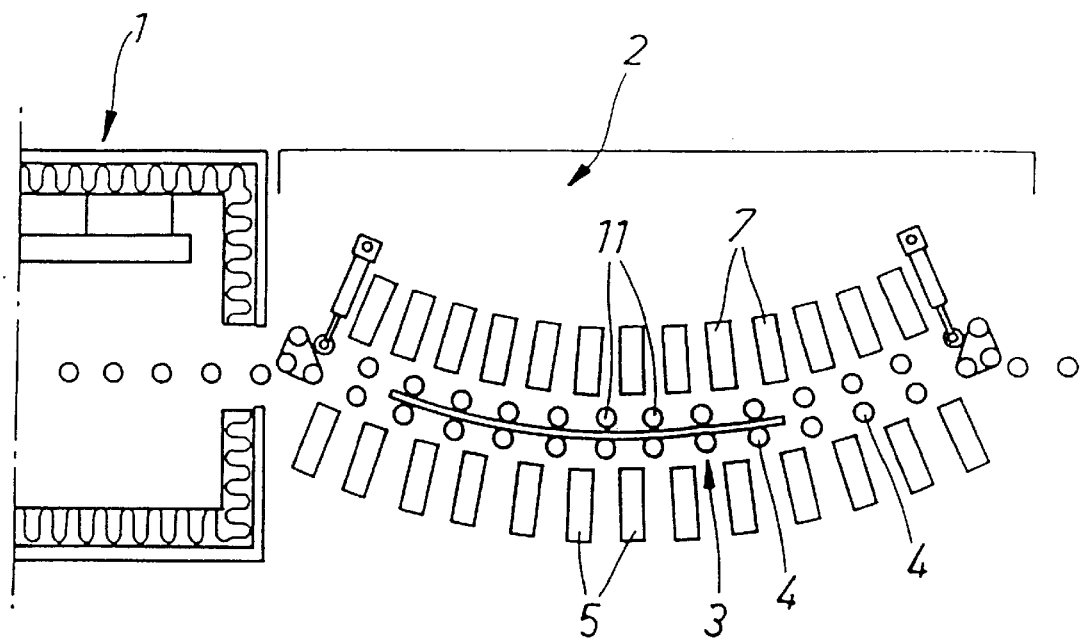
FIG. 3 is a schematic side view of a bending and tempering station according to an embodiment of the present invention during a bending operation.

FIG. 3 illustrates a situation in which the glass has reached a certain degree of bending. Concurrently with the arching of a conveyor to the configuration shown in FIG. 3, the mid-section of individual rolls has been deflected downwards by means of a power unit 18, as illustrated in FIGS. 6 and 7. In the case of FIG. 6, the roll 4 is divided into two sections 4a and 4b, having therebetween a link joint whose height is adjustable by means of the power unit 18. The roll sections 4a and 4b may, however, be permanently deflected to a certain position, whereby the deflection is not altered during a bending operation. When another degree of bending is required, the deflection is changed, such as by means of a manually operated set screw which replaces the power unit 18. However, the deflection during the course of bending may be preferred. End bearings 19 must allow a slight turning of the roll ends.

Naturally, the roll can be divided into an arbitrary number of sections.

It is also possible to employ an arch-bending roll 4' (FIG. 7). In order to make the axle 4' thinner and more readily bendable, it is possible to employ a flexible shaft fitted at small intervals with supporting rollers. Thus, the shaft and the rollers together provide a roll 4', above which the press rollers 11 are suspended from pneumatic cylinders 17.

Upon reaching the final degree of bending, the tempering blast is commenced while the glass sheet continues oscillation between rolls 4 and rollers 11. As the tempering operation is finished, the upper press wheels 11 are lifted and returned to their top position. Thus, the bottom position of rollers 11 is a working position and the top position is a rest position.

FIG. 4 illustrates the disposition of press wheels, selected so as not to form successive rows relative to the glass advancing direction. The press wheels are preferably structurally light and well journalled for free rotation. The wheels are preferably provided with, for example, plastic bodies and, on their peripheries, with a fibrous coating of a material temporarily resistant to a high temperature (about 630° C.). The coating material can be any suitable material used in roll coatings.

The resilient suspension and adjustable pressing force of rollers provide an essential advantage over conventional benders in which the roller axles are fixedly connected to tempering boxes.

Since bending around the longitudinal axis is lesser, the tempering boxes need not necessarily be deflected in that direction. However, the tempering boxes 5, 7 can also be divided in their longitudinal direction in two or more sections which can be deflected relative to each other in a manner corresponding to the deflection between the sections (e.g. 4a, 4b) of rolls 4.

The invention is not limited to the above exemplary embodiment but its structural details can be varied in many ways. For example, the pneumatic springs 17 can be replaced with other types of springs. Also the restriction of the movement of rollers 11 to a top and bottom position can be provided in a plurality of ways. The press rollers or wheels need not necessarily be suspended to nozzle boxes 7 but the suspension can be effected to any structures. One and the same horizontal axle 13 can also be used for journalling a plurality of press wheels 11 supported by a single pneumatic spring 17.

While this invention has been illustrated and described in accordance with a preferred embodiment, it is recognized that variations and changes may be made therein without departing from the invention as set forth in the claims.

What is claimed is:

1. A method for bending and tempering glass sheets, comprising the steps of:

heating a glass sheet having a top and a bottom surface in a furnace to a bending temperature;

transferring the heated glass sheet from the furnace onto a roll conveyor in a bending and tempering station;

producing a first curvature in the heated glass sheet by varying a relative vertical position of rolls of the roll conveyor such that the roll conveyor is in an arched condition;

deflecting at least midsections of at least some of the rolls downward relative to ends of the rolls;

moving, simultaneously as the rolls are deflected downward, a plurality of vertically movable press rollers into contact with the top surface of the glass sheet to produce a second curvature in the heated glass sheet;

controlling a pressure on the glass sheet of each press roller of the plurality of press rollers with a plurality of pressure control devices, each pressure control device of the plurality of pressure control devices corresponding to a respective press roller of the plurality of press rollers; and tempering the glass sheet with tempering air blasting means, the tempering air blasting means including a movable upper nozzle box, the press rollers being movably attached to the upper nozzle box and being movable relative to the upper nozzle box by the pressure control devices corresponding to the press rollers, wherein the press rollers are moved into contact with the top surface of the glass sheet by moving the press rollers together with the upper nozzle box and by moving the press rollers relative to the upper nozzle box with the corresponding pressure control devices, and wherein the tempering step includes blasting a tempering gas on both the top and bottom surfaces of the heated glass sheet while the glass sheet is on the roll conveyor when it is in the arched condition.

2. A method as set forth in claim 1, wherein the moving step includes moving each press roller of the press rollers between a respective top rest position and a respective bottom working position and wherein each pressure control device of said plurality of pressure control devices comprises a separate pneumatic spring associated with each press roller, respectively.

3. A method as set forth in claim 2, wherein the controlling step includes controlling the pressure on the glass sheet so that different press rollers produce different pressing forces.

4. A method as set forth in claim 2, wherein the press rollers are moved from the rest position to the working position as soon as the heated glass sheet is transferred onto the roll conveyor in a direction of travel of the heated glass sheet to a position beneath the press rollers.

5. An apparatus for bending and tempering glass sheets, comprising:

a roll conveyor for supporting a glass sheet, the glass sheet having a top and a bottom surface, the roll conveyor including a plurality of vertically movable rolls for arching the conveyor to a curvature corresponding to a desired degree of bending in the glass sheet, the rolls each having two opposed ends, at least some of the rolls being deflectable such that at least mid-sections thereof are movable relative to a vertical position of ends thereof;

a plurality of movable press rollers disposed above the rolls, the press rollers being movable in a vertical direction to apply a pressing force to the top surface of the glass sheet supported on the rolls of the roll conveyor;

a plurality of pressure control devices corresponding to the plurality of movable press rollers, each pressure control device of the plurality of pressure control devices controlling a pressure on the glass sheet of a respective press roller of the plurality of press rollers; and one or more movable lower tempering boxes having top surfaces provided with tempering orifices, and one or more movable upper tempering boxes having bottom surfaces provided with tempering orifices, the lower tempering boxes being disposed below the roll conveyor and the upper tempering boxes being disposed above the roll conveyor, the upper tempering boxes and the lower tempering boxes being movable such that the top and bottom surfaces of the lower and upper tempering boxes, respectively, are moved to conform to a shape of the conveyor in an arched condition, the lower and upper tempering boxes being arranged to temper the glass sheet as it is supported on the rolls of the roll conveyor, wherein the press rollers are movably attached to the upper tempering boxes, the press rollers being vertically movable relative to the glass sheet by being moved together with the upper tempering boxes and by being moved relative to the upper tempering boxes by the control devices.

6. An apparatus as set forth in claim 5, wherein each pressure control device includes a pneumatic spring.

7. An apparatus as set forth in claim 6, wherein the pneumatic springs move the press rollers between an upper rest position and a lower working position.

8. An apparatus as set forth in claim 7, wherein, in the working position, a lowest point of each press roller is separated from a conveying plane defined by the rolls of the roll conveyor a distance less than a thickness of the glass sheet such that a leading edge of the glass sheet lifts the press rollers against a force of the pneumatic spring.

9. An apparatus as set forth in claim 5, wherein the rolls each include at least two axial sections, vertically movable link joint between each two axial sections, and a power unit, the power unit vertically moving the link joint.

10. An apparatus as set forth in claim 5, wherein the rolls include flexible axles and a power unit, the power unit deflecting the axles.

11. An apparatus for bending and tempering glass sheets, comprising:

a roll conveyor for supporting a glass sheet, the glass sheet having a top and a bottom surface, the roll conveyor including a plurality of vertically movable rolls for arching the conveyor to a curvature corresponding to a desired degree of bending in the glass sheet, the rolls each having two opposed ends, at least some of the rolls being deflectable such that at least mid-sections thereof are movable relative to a vertical position of ends thereof;

a plurality of movable press rollers disposed above the rolls, the press rollers being movable in a vertical direction to apply a pressing force to the top surface of the glass sheet supported on the rolls of the roll conveyor; and one or more tempering boxes arranged to temper the glass sheet as it is supported on the rolls of the roll conveyor, wherein the one or more tempering boxes include upper tempering boxes, arms pivotally attached, at first ends thereof, to the upper tempering boxes, the press rollers being mounted on second ends of the arms, and limiting abutments mounted on the upper tempering boxes, the limiting abutments limiting an amount of pivoting of the arms and thereby defining a working position and a top rest position for the press rollers.

* * * * *